(12) United States Patent
Barone (10) Patent No.: US 7,837,771 B2
(45) Date of Patent: Nov. 23, 2010

(54) ROTARY CYLINDER DUAL DIVERTER VALVE

(75) Inventor: Michael R. Barone, Amston, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 294 days.

(21) Appl. No.: 11/974,248

(22) Filed: Oct. 12, 2007

(65) Prior Publication Data

US 2009/0095154 A1 Apr. 16, 2009

(51) Int. Cl.
*B01D 59/26* (2006.01)

(52) U.S. Cl. .............................. 96/130; 96/121; 96/124; 96/131; 95/96; 137/625.32; 137/625.46

(58) Field of Classification Search .................. 96/121, 96/124, 130, 131; 95/96; 137/625.32, 625.46
See application file for complete search history.

(56) References Cited

U.S. PATENT DOCUMENTS

| | | | | |
|---|---|---|---|---|
| 630,124 | A * | 8/1899 | Stage ..................... | 137/625.22 |
| 2,853,102 | A * | 9/1958 | Walker .................... | 137/625.42 |
| 3,155,471 | A * | 11/1964 | Schymik et al. ............... | 96/116 |
| 4,162,146 | A * | 7/1979 | Seibert ..................... | 96/113 |
| 4,209,308 | A * | 6/1980 | Blodgett ...................... | 96/124 |
| 4,520,847 | A * | 6/1985 | Baron .................... | 137/625.43 |
| 4,704,069 | A | 11/1987 | Kocher et al. | |
| 4,711,645 | A | 12/1987 | Kumar | |
| 4,825,908 | A | 5/1989 | Tsuchihashi et al. | |
| 4,968,334 | A * | 11/1990 | Hilton ....................... | 96/124 |
| 5,112,367 | A * | 5/1992 | Hill ................. | 95/98 |
| 5,114,441 | A * | 5/1992 | Kanner et al. ................. | 95/98 |
| 5,197,514 | A * | 3/1993 | Jaun ............................ | 137/597 |
| 5,256,174 | A * | 10/1993 | Kai et al. ...................... | 96/116 |
| 5,383,491 | A | 1/1995 | Heilman | |
| 5,584,322 | A * | 12/1996 | Poschl et al. ............ | 137/625.46 |
| 5,692,893 | A | 12/1997 | Houston | |
| 5,941,206 | A * | 8/1999 | Smith et al. ............... | 123/190.4 |
| 6,143,056 | A * | 11/2000 | Smolarek et al. ............... | 95/96 |
| 6,152,163 | A * | 11/2000 | Tsargorodski et al. ...... | 137/240 |
| 6,311,719 | B1 * | 11/2001 | Hill et al. ..................... | 137/312 |
| 6,533,846 | B1 * | 3/2003 | Keefer et al. ................... | 96/125 |
| 6,672,336 | B2 | 1/2004 | Nichols | |

(Continued)

OTHER PUBLICATIONS

Perry, J.L.; Levan, Douglas, Air Purification in Closed Environments An Overview of Spacecraft Systems, NASA/TP-2003-0000981, NASA Marshall Space Flight (enter, 2003).

*Primary Examiner*—Robert J Hill, Jr.
*Assistant Examiner*—Christopher P Jones
(74) *Attorney, Agent, or Firm*—Kinney & Lange, P.A.

(57) ABSTRACT

A rotary cylinder valve comprises a valve body, a valve cylinder rotationally mounted within the valve body, and first, second, third and fourth valve seats coupled to the valve body. The valve cylinder has a first position in which dual independent flow paths connect the first valve seat with the second valve seat, and connect the third valve seat with the fourth valve seat. The valve cylinder is rotatable to a second position in which the dual independent flow paths connect the first valve seat with the fourth valve seat, and connect the third valve seat with the second valve seat. The valve seats form seals against the valve cylinder, such that no flow path connects the first valve seat with the third valve seat.

20 Claims, 5 Drawing Sheets

U.S. PATENT DOCUMENTS

| | | | |
|---|---|---|---|
| 7,445,663 B1 * | 11/2008 | Hunter et al. | 95/96 |
| 2002/0148040 A1 * | 10/2002 | Mateina | 4/675 |
| 2005/0144959 A1 * | 7/2005 | Lu et al. | 60/776 |

* cited by examiner

Fig. 5

ROTARY CYLINDER DUAL DIVERTER VALVE

BACKGROUND

The present invention relates generally to flow control, and in particular to flow control and diverter valves for fluid processing. In specific embodiments, the invention concerns a rotary cylinder valve that operates as a dual diverter valve for chemical removal systems such as an amine-based carbon dioxide ($CO_2$) and water ($H_2O$) removal system.

Environmental control and life support systems (ECLSS) are a critical aspect of human spaceflight. The prohibitive cost of delivering consumables into space makes it imperative that these systems utilize recirculation, particularly for high-volume consumables like water and air. Recirculating air revitalization and $CO_2$ removal systems are thus an integral part of ECLSS technology, including ECLSS applications for the space shuttle, the international space station, and future missions slated for the Orion crew vehicle or other advanced spaceflight systems.

Carbon dioxide removal is essential to ECLSS, because $CO_2$ helps regulate the breathing mechanism. Any increase above a few tenths of a percent $CO_2$ by volume can cause headaches and nausea, while "foul air" conditions (where $CO_2$ concentrations exceed a percent) can ultimately be fatal. Typical $CO_2$ removal systems employ active amine adsorption sites (usually distributed in amine "beds"), which remove metabolic $CO_2$ from air as it recirculates through the crew cabin, crew quarters, or even individual spacesuits. This process is similar to amine-based gas "sweetener" systems, which remove $CO_2$, hydrogen sulfide ($H_2S$) and other sour-smelling gases from oil refinery, petrochemical, and natural gas processing streams.

$CO_2$ removal for ECLSS requires precision flow control and fail-safe valve assemblies, incorporated into small, lightweight packages with simple, reliable designs that meet the rigorous demands of aerospace applications. There is an ongoing need for valves that address these issues, and, ideally, are further adaptable to collective protection systems that guard against chemical, biological, and nuclear agents, and to other, more generalized fluid processing applications.

SUMMARY

This invention concerns a rotary cylinder valve. The valve includes a valve body (or valve housing), a valve cylinder rotationally mounted within the valve body, and at least four valve seats coupled to the valve body. In a first position, the valve cylinder forms dual, independent flow paths that connect a first valve seat with a second valve seat, and connect a third valve seat with a fourth valve seat. The valve cylinder is rotatable from the first position to a second position, in which the dual, independent flow paths connect the first valve seat with the fourth valve seat, and connect the third valve seat with the second valve seat. The valve seats form seals against the valve cylinder, such that no flow path connects the first valve seat with the third valve seat.

DETAILED DESCRIPTION

Figure 1A:
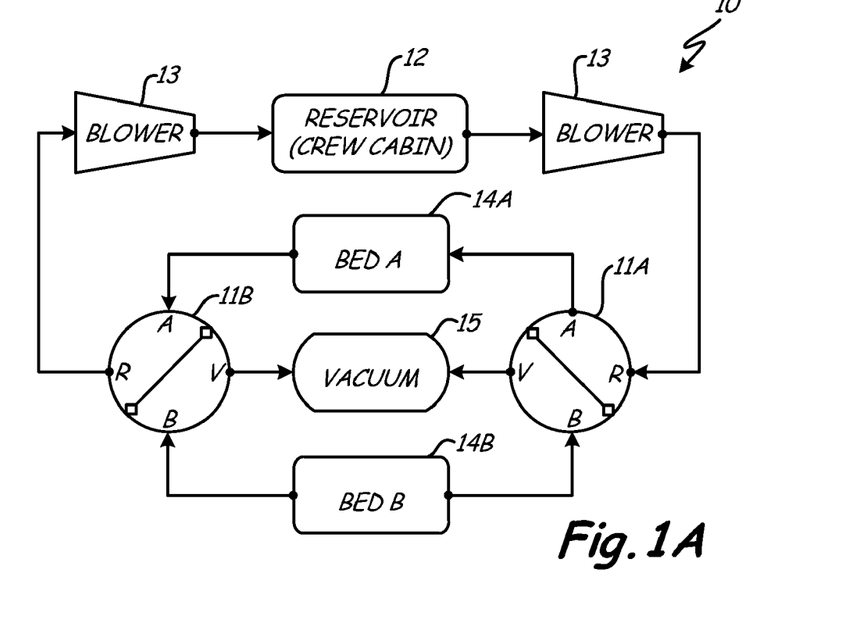
FIGS. 1A and 1B are schematic illustrations of a carbon dioxide removal system, showing rotary cylinder valves in first and second positions, respectively.
Figure 1B:
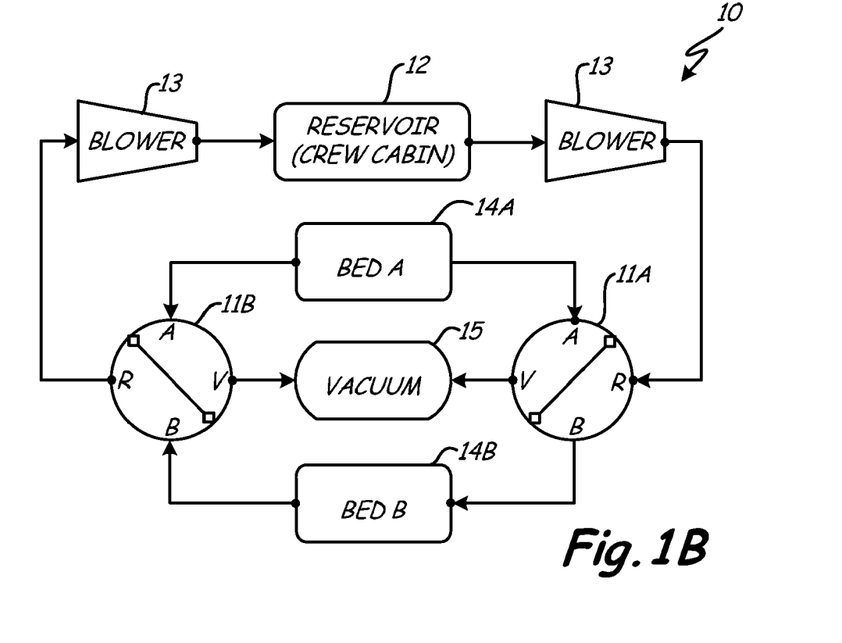

FIGS. 1A and 1B are schematic illustrations of carbon dioxide ($CO_2$) removal system 10, with rotary cylinder valves 11A and 11B each in a first position (FIG. 1A), and a second position (FIG. 1B), respectively. $CO_2$ removal system 10 operates on air circulating through reservoir 12, and comprises inlet valve 11A, outlet valve 11B, blowers 13, and sorbent beds 14A, 14B. System 10 vents $CO_2$ to vacuum 15.

Reservoir 12 is a fluid reservoir that provides an inlet flow to inlet valve 11A, and receives an outlet flow from outlet valve 11B. In one embodiment, reservoir 12 is a crew area configured for life support during spaceflight, such as the cabin and crew quarters of an Orion crew vehicle. In other embodiments, reservoir 12 is the crew or personnel area of another space vehicle, an emergency life support module, or a collective protection system. In further embodiments, reservoir 12 is an individual life-support air reservoir for a spacesuit or a personal rebreathing system. Alternatively, reservoir 12 is a generic fluid reservoir with inlet and outlet flows, and system 10 is a general-purpose fluid processing system.

Blowers 13 are fans or other overpressure-generating devices configured to circulate the inlet and outlet flows through reservoir 12 and system 10. In FIGS. 1A and 1B, the number of blowers 13 is two, but this number is merely representative. In various alternate embodiments blowers 13 vary in number. The particular locations of blowers 13 are also representative, with blowers 13 deployable either upstream and downstream of reservoir 12, as shown, or in other locations throughout system 10.

In a preferred embodiment, sorbent beds 14A and 14B comprise a solid or pelletized regenerative amine sorbent, or a combination of zeolites and a silica gel, upon which both $CO_2$ and water ($H_2O$) adsorb. In these embodiments, system 10 is a combined $CO_2$/$H_2O$ removal system. In other embodiments, beds 14A and 14B comprise a material upon which only $CO_2$ adsorbs, or another form of chemical or particulate removal material such as a filter, a catalyst, or a liquid-based scrubber. In these embodiments system 10 is a generalized fluid processing system for chemical removal.

Vacuum 15 is typically a region of low ambient pressure outside a crew cabin, such as the space outside a crew capsule in low earth orbit, or in interplanetary flight. Alternatively, vacuum 15 is generated by means of a vacuum pump or similar under-pressure generator.

Generally speaking, vacuum 15 is not a perfect vacuum, but has vacuum pressure $P_V$ sufficiently below that of reservoir 12 to generate a sink flow toward vacuum 15. In particular, vacuum 15 has sufficiently low pressure $P_V$ to facilitate swing-pressure regeneration of beds 14A and 14B, via desorption or an analogous regenerative process that vents chemicals from beds 14A, 14B to vacuum 15. In aerospace applications, vacuum 15 generally has pressure $P_V$ below one percent (1%) of atmospheric pressure at sea level; that is, below one kilopascal (such that $P_V$<1 kPa).

Inlet valve 11A and outlet valve 11B are rotary cylinder valves having at least four valve seat/header assemblies R, A, V and B. The valve seat/header assemblies have flow connections to the various components of system 10. In the first position (FIG. 1A), for example, inlet valve 11A forms a source flow path between reservoir/crew cabin 12 (header R) and sorbent bed 14A (header A), and outlet valve 11B forms a source flow path from sorbent bed 14A (header A) back to reservoir/crew cabin 12 (header R). Flow along the completed source flow circuit is achieved via blowers 13, as described above.

As shown in FIG. 1A, inlet valve 11A also forms an independent sink or vent flow path between sorbent bed 14B (header B) and vacuum 15 (header V). Outlet valve 11B does the same. This allows chemicals previously adsorbed onto or collected by bed 14B to be desorbed and vented to vacuum 15. Note that valves 11A, 11B vent bed 14B to vacuum 15 at both ends, achieving double-ended desorption that is more efficient than single-ended configurations in the prior art.

Adsorption is typically an exothermic process, while desorption is typically an endothermic process. In the first position of FIG. 1A, therefore, sorbent bed 14A undergoes $CO_2$/$H_2O$ adsorption, generating thermal energy, while sorbent bed 14B undergoes $CO_2$/$H_2O$ desorption, which requires thermal energy.

In contrast to prior art systems, which generate waste heat from adsorption and/or require external energy input to encourage desorption, system 10 is configurable such that sorbent beds A and B are thermally coupled. In this embodiment, the process of adsorption onto bed 14A provides thermal energy for desorption from bed 14B. The thermal coupling is typically achieved by arranging sorbent beds 14A, 14B into a series of alternating layers, with both beds comprised within a single "can" or adsorption/desorption vessel. Alternatively, a heat exchanger or other device provides a thermal coupling between distinct adsorbing and desorbing vessels.

In the second position (FIG. 1B), inlet valve 11A forms a source flow path between reservoir/crew cabin 12 (header R) and sorbent bed 14B (header B), and an independent sink flow path between sorbent bed 14A (header A) and vacuum 15 (header V). Similarly, outlet valve 11B forms a source flow path between sorbent bed 14B (header B) and reservoir/crew cabin 12, and an independent sink flow path between sorbent bed 14A (header A) and vacuum 15 (header V). In this position, the source flow circulates through sorbent bed 14B, and the sink flow paths provide for double-ended desorption of bed 14A.

Valves 11A, 11B operate as dual diverter valves, cycling one independent flow (the source flow, to or from reservoir 12) from sorbent bed 14A to sorbent bed 14B, while simultaneously cycling a second independent flow (the sink flow, to or from vacuum 15) from bed 14B to bed 14A. This provides for continuously-cycling $CO_2$/$H_2O$ removal from reservoir 12, in which sorbent beds 14A and 14B undergo a complementary swing pressure regeneration cycle via double-ended desorption to vacuum 15.

For aerospace applications, rotary cylinder/dual diverter valves 11A, 11B have a typical cycle time on the order of four to thirty minutes (4-30 min). In general, however, the cycle time varies with $CO_2$/$H_2O$ or other chemical concentration, flow rate, and the physical dimensions of sorbent beds 14A and 14B. In other, more generalized fluid processing applications, the cycle time is arbitrary.

Rotary cylinder valves 11A, 11B have significant advantages over the prior art. In particular, they provide dual independent flow paths that replace a number of individual flow valves, vent valves and selector valves, as employed in prior art $CO_2$/$H_2O$ removal systems. The dual independent flow paths, moreover, do not have a configuration that connects the source (header R) and vent (header V) flow paths. This provides an inherent safeguard against accidental cabin ventilation, by preventing flow between source header R and vent header V.

Rotary cylinder valves 11A, 11B provide a simpler, lighter, and more reliable design than prior art systems. In a preferred embodiment, moreover, inlet valve 11A and outlet valve 11B are configured in a single, axially-compounded configuration (see FIGS. 4 and 5, below), in which a single rotary actuator simultaneously rotates both valves between the first and second positions. This configuration further reduces mechanical requirements, and further protects against venting of reservoir 12 to vacuum 15, by preventing accidental flow connections via sorbent bed 14A or 14B. In this embodiment, valves 11A and 11B have no credible failure mode (that is, short of actual physical destruction) associated with accidental ventilation or purge to vacuum.

Figure 2:
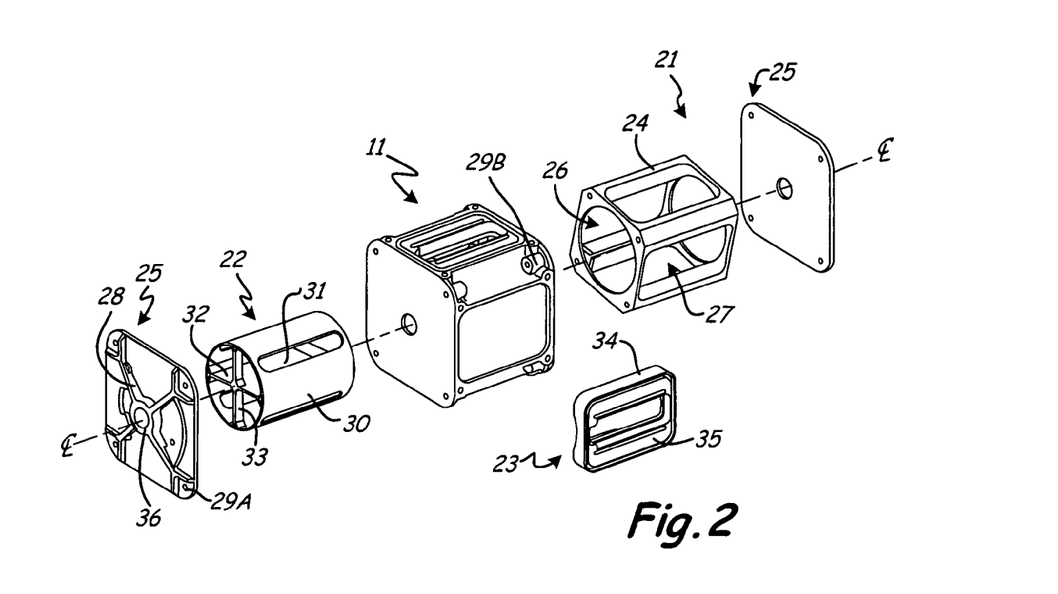
FIG. 2 is an exploded view showing one of the rotary cylinder valves in FIGS. 1A and 1B.

FIG. 2 is an exploded view of rotary cylinder valve 11. Rotary cylinder valve 11 is a dual diverter valve comprising valve body (valve housing) 21, valve cylinder 22, and a plurality of at least four valve seat/header assemblies 23.

Rotary cylinder/dual diverter valve 11 is representative of either inlet valve 11A or outlet valve 11B, as described above with respect to $CO_2$/$H_2O$ removal system 10 of FIGS. 1A and 1B. Note, however, that the distinctive features of individual rotary cylinder valve 11 are not limited by that representative application. In particular, valve 11 as embodied in FIG. 2 is not axially compounded, and its distinctive elements do not depend the other components of system 10.

Valve body/housing 21 comprises frame 24 and endcaps 25. Frame 24 provides cylinder apertures 26 for valve cylinder 22, and header apertures 27 for valve seat/header assemblies 23. Endcaps 25 typically comprise support members 28 to support the rotation of valve cylinder 22 about axial centerline $C_L$. In some embodiments, support members 28 also provide structural rigidity to valve body 21, or provide external mounting structures for valve 11. In these embodiments support structures 28 are variously located on either endcaps 25 or on frame 24, or both.

Frame 24, endcaps 25 and the other various components of valve 11 are formed by a variety of techniques including, but not limited to, molding, extrusion, machining, welding, and mechanical attachment. In a preferred embodiment, frame 24 and endcaps 25 are comprised of a high-strength aluminum alloy. In alternate embodiments, frame 24 and endcaps 25 are comprised of another metal alloy, or of a durable, machinable polymer such as a plastic, or of a combination of such materials.

Typically, endcaps 25 are attached to frame 24 at mechanical attachment points 29A and 29B, after the insertion of valve cylinder 22 via one of cylinder apertures 26. In these embodiments, mechanical attachment is variously achieved by bolts, screws, machine screws, or by spot welds, continuous welds, or chemical welds, and a gasket or sealant is sometimes incorporated to provide a pressure seal. Alternatively, attachment is achieved via epoxy joints or other adhesion joints, or, in some embodiments, via aluminum tape or other ad hoc techniques. In further alternate embodiments, one or more of endcaps 25 are formed as a unitary structure with frame 24.

Valve cylinder 22 comprises cylinder wall 30 with valve ports 31, flow divider 32 and cylinder supports 33. In a preferred embodiment, valve cylinder 22 is comprised of highly polished stainless steel. In this embodiment, cylinder wall 30 and valve ports 31 are typically formed of a unitary structure, into which flow divider 32 and cylinder wall supports 33 are welded or mechanically attached to the interior of cylinder wall 30. In alternate embodiments, valve cylinder 22 is comprised of another metal alloy, or of a durable, machinable plastic or other polymer material, using various manufacturing and mechanical attachment techniques as described above.

Valve cylinder 22 is rotationally mounted within valve housing 21, such that cylinder 22 rotates about axial centerline $C_L$. In a preferred embodiment, the rotational mounting employs bushings (not shown), but in alternate embodiments different rotational mount techniques are used.

As illustrated by FIG. 2, flow divider 32 divides valve cylinder 22 such that two pairs of valve ports 31 are in independent flow communication, and form dual independent flow paths through valve 11. As valve cylinder 22 rotates within valve housing 21, valve ports 31 enter into flow communication with different valve seat/header assemblies 23, diverting the dual independent flow paths from one valve seat/header pairing to another, as described below.

Supports 33 provide structural support to cylinder wall 30 at the axial ends of valve cylinder 22. In some embodiments, supports 33 are also provided at various interior locations. Supports 33 have both open-geometry configurations, which do not prevent axial flow through the ends of valve cylinder 22 (as shown in FIG. 2), and closed-geometry configurations, which do restrict axial flow. In the closed-geometry configurations, supports 33 essentially form internal endwalls for valve cylinder 22 (see FIG. 3).

Valve seat/header assemblies 23 comprise valve seals (or valve seats) 34, valve headers 35 and seat springs (not shown). In FIG. 2 there are four valve seat/header assemblies, with one shown in detail. This number is, however, merely representative. In alternate embodiments the number of valve seat/header assemblies is four or more, with the number of header apertures 27 and valve ports 31 adjusted accordingly.

In a preferred embodiment, valve seats 34 are unitary structures formed of durable, wear-resistance polymer materials including lubricious, machinable plastics. In alternate embodiments, valve seats 34 comprise a polymer seal proximate valve cylinder 22, and an aluminum carrier proximate headers 35.

Valve headers 35 are typically unitary structures machined from the same material as valve body 21. Alternatively, valve headers 35 are comprised of another material, and/or employ a different construction technique as described above with respect to housing 21 and valve cylinder 22.

The seat springs (not shown) are located between valve seats/valve seals 34 and headers 35. The springs are typically comprised of a flexible, elastic material such as hardened steel. In a preferred embodiment, the seat springs are comprised of stainless steel with a canted coil design.

Valve seals 34 are installed inside valve body 21 within header apertures 27. Valve headers 35 are coupled to valve body 21 at apertures 27, typically via mechanical fasteners such as screws, or by another mechanical attachment technique. The seat springs hold valve seals 34 against valve cylinder 22, forming sliding seals with a contact force that is preferentially twenty to forty pounds (20-40 lb), or approximately ninety to one hundred eighty newtons (90-180 N). In alternate embodiments, the contact force varies with the overall size and configuration of valve seat/header assemblies 23, and with the differential pressure experienced by valve 11.

In operation of rotary cylinder/dual diverter valve 11, an actuator (not shown) is axially coupled to valve cylinder 22, typically through one or more of endcaps 25 at shaft support 36. Valve seat/header assemblies 23 form flow connections to various components of a fluid processing system via headers 35, analogously to inlet valve 11A and outlet valve 11B of $CO2/H2O$ removal system 10, as shown in FIGS. 1A and 1B, above. This places the fluid processing system in flow communication with valve cylinder 22 via valve ports 31 and valve seats/valve seals 34, forming dual independent flow paths through valve 11. As the actuator rotates valve cylinder 22 from a first position to a second position, it diverts the dual independent flow paths from one set of headers 35 to another, redirecting flow through the valve.

Figure 3:
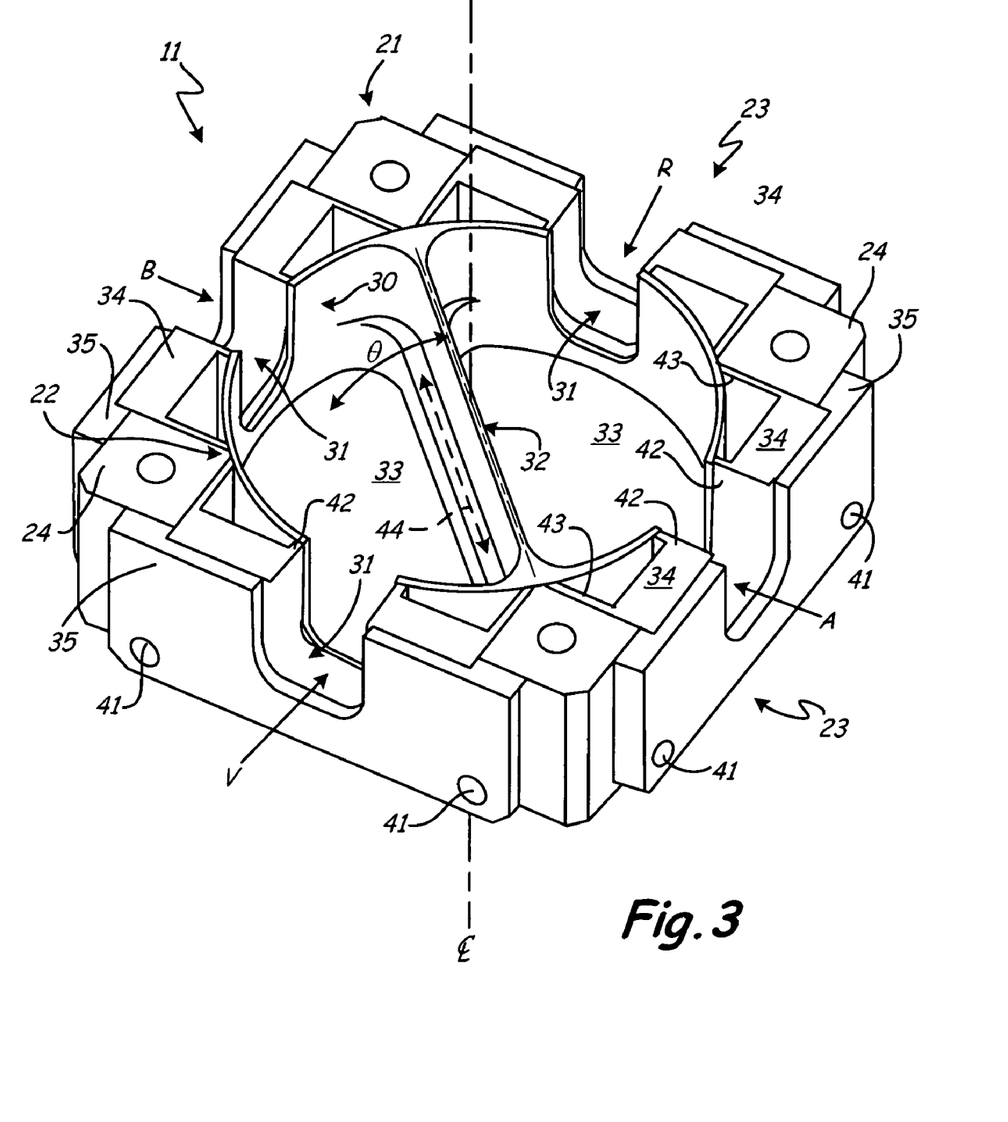
FIG. 3 is a cutaway view showing an inside end of the rotary cylinder valve in FIG. 2.

FIG. 3 is a cutaway view showing an inside end of rotary cylinder valve 11, with valve cylinders 22 rotatable at angle θ within valve housing 21. In the embodiment of FIG. 2, cylinder support 33 exhibits a closed geometry, such that support 33 forms an internal endwall for valve cylinder 22.

Valve seat assemblies 23 are affixed to frame 24 of valve housing 21 at mechanical attachment points 41, which function analogously to points 29A and 29B of FIG. 2, above. Valve seats 34 form seals against valve cylinder 22, placing various headers 35 in flow communication with various valve ports 31, depending upon the rotational position θ of valve cylinder 22. Flow divider 32 divides valve cylinder 22, forming dual independent flow paths through valve 11 among the various headers 35.

FIG. 3 shows valve 11 in a first angular position, arbitrarily defined at θ=0, where valve cylinder 22 forms dual independent flow paths between a first header (source header R) and a second header (first process header A), and between a third header (sink header V) and a fourth header (second process header B). This corresponds to the first position of inlet valve 11A and outlet valve 11B in FIG. 1A, above. Flow divider 32 prevents flow communication between the dual paths, and, together with valve seats/valve seals 34, prevents flow between the first header (source header R) and the third header (sink header V).

As valve cylinder 22 rotates about axial centerline $C_L$ toward $\theta=90°$, as measured counterclockwise in FIG. 3, it reaches a second angular position. In the second position, the dual independent paths connect the first header (R) with the fourth header (B), and connect the third header (V) with the first header (A). That is, valve 11 diverts the source flow (flow to or from source header R) from the first process header (A) to the second process header (B), and diverts the sink flow (to sink header V) from the second process header (B) to the first process header (A). During this rotation, flow divider 32 and valve seals 34 continuously prevent flow communication between the first header (source header R) and the third header (sink header V).

In preferred embodiments, valve seals 34 comprise independent inner seals 42, proximate headers 35, and outer seals 43, spaced from headers 35. Inner seals 42 and outer seals 43 provide redundant protection against purging flow between source header R and sink header V. This embodiment also provides a "cutoff" position between the first position and the second position, in which the source flow (flow to or from source header R) and the sink flow (to sink header V) are both cut off. In the cutoff position, there is no flow path connecting the first valve seat/header assembly with any other valve seat/header assembly, and no flow path connecting the third valve seat/header assembly with any other valve seat/header assembly.

In some of these preferred embodiments, the cutoff position corresponds to an angular range between approximately twenty-seven and one half degrees and sixty-two and one half degrees ($27.5° < \theta < 62.5°$). In this cutoff position, valve 11 prevents flow between source header R and any other valve header, and between sink header V and any other valve header. Note that the cutoff position inherently limits the first position to an angular range of approximately twenty-seven and one half degrees about zero (−27.5.degree.<.theta.<27.5.degree.), and limits the second position to an angular range of about twenty-seven and one half degrees about ninety degrees (62.5.degree.<.theta.<117.5.degree.).

While FIG. 3 represents dual diverter valve 11 with two independent flow paths among four valve seat/header assemblies 23, these numbers are merely representative, and may be larger. In one embodiment, for example, the angular range between approximately forty degrees and fifty degrees (40°<θ<50°) corresponds to a pressure equalization position. In the equalization position, there remains no flow path between the first header (source header R) and the third header (sink header V), but there is an additional, intermediate flow path between the second header (first process header A) and the fourth header (second process header B). The intermediate flow path can be provided, for example, along an inner conduit within flow divider 32, as illustrated by hidden (dashed) line 44 in FIG. 3, or, alternatively, along another path within cylinder support/endwall 33.

The intermediate flow path provides for pressure equalization between second and fourth valve seats/header assemblies 23. This has particular utility for embodiments in which the process headers (A and B) communicate with process beds, and the process beds communicate with two dual diverter valves, as shown for input valve 11A and output valve 11B of FIGS. 1A and 1B, above. In this configuration the equalization position cuts the process beds off from both the source and the sink flows (that is, from source header R and sink header V), but not from each other.

In spaceflight applications, the intermediate flow path produces an ideal equalization pressure of approximately fifty percent (50%) of cabin pressure, which reduces ullage losses by approximately half. Specifically, in the prior art air is lost to vacuum when a pressurized bed cycles from adsorption (source flow, to or from reservoir header R) to desorption (sink flow, to header V). Air is also required to re-pressurize the alternate bed, as it cycles from desorption (sink flow) to adsorption (source flow). Pressure equalization reduces this air loss (ullage) by approximately fifty percent, because the depressurizing bed delivers half its air to the pressurizing bed before venting to vacuum. Other means can be used to further reduce ullage losses, but the intermediate flow path of valve 11 has the advantage that it occurs automatically during the valve cycle, and requires no external energy source for active fluid pumping.

In some of the embodiments having an intermediate pressure equalization position, the rotational position of valve cylinder 22 is restricted by a mechanical device such as a pin. This limits valve cylinder 22 to reciprocal motion between the first and second positions, preventing accidental formation of an intermediate flow path between the first and third headers (that is, between source header/reservoir R and sink header/ vacuum V). In other, more generalized embodiments, valve cylinder 22 attains a full rotational range of three hundred and sixty degrees (360.degree.), and undergoes either reciprocal or continuous rotational motion.

Figure 4:
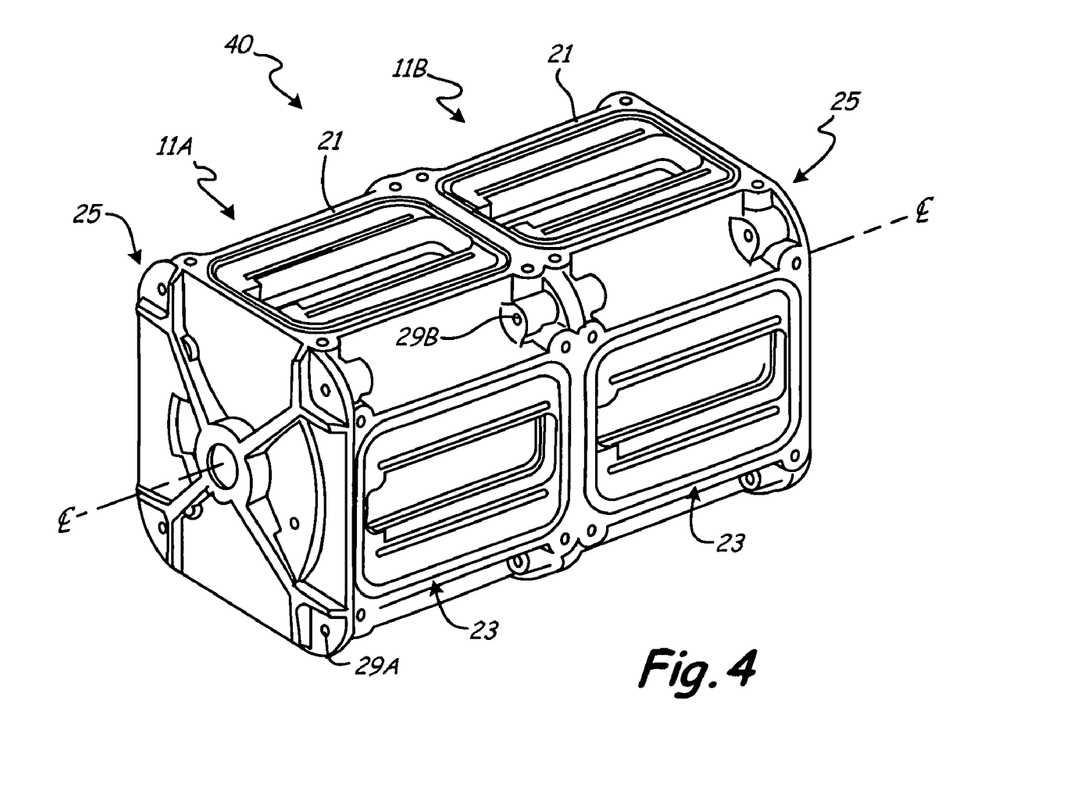
FIG. 4 is a perspective view showing an axially compounded embodiment of the rotary cylinder valve in FIG. 2.

FIG. 4 is a perspective view showing axially compounded rotary cylinder valve 40. Axially compounded valve 40 comprises dual diverter (inlet) valve 11A and dual diverter (outlet) valve 11B, each configured according to the limitations of valve 11 of FIG. 1. Dual diverter valve 11B is axially coupled to valve 11A along centerline $C_L$, such that valves 11A and 11B co-rotate. When coupled in phase, valves 11A and 11B co-rotate from the first position to the second position, and to any cutoff, equalization, or other intermediate positions.

Axially coupled valves 11A and 11B form compounded rotary cylinder valve 40 via mechanical attachment at points 29B, with endcaps 25 attached at points 29A. These attachments take a variety of forms, as discussed above with respect to FIG. 2. In the particular embodiment of FIG. 4, axially compounded valve 40 comprises eight distinct valve seat assemblies 23, of which four are shown.

Figure 5:
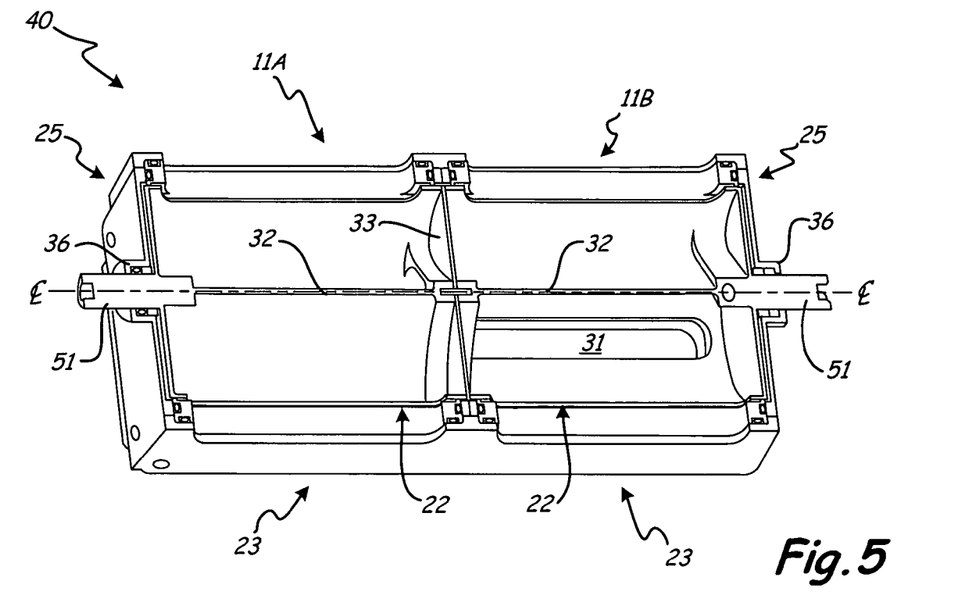
FIG. 5 is a cutaway side view of the axially compounded valve in FIG. 4.

FIG. 5 is a cutaway side view of axially compounded rotary cylinder valve 40. Compounded valve 40 comprises input valve 11A and output valve 11B, axially coupled as described above with respect to FIG. 4.

FIG. 5 shows that valves 11A, 11B are also coupled at endwall 33 of valve cylinders 22, such that valve cylinders 22 co-rotate when actuated by rotary actuator/shaft 51, which is supported at shaft supports 36. In a preferred embodiment, valve cylinders 22 form an integrated, axially compounded valve cylinder having single endwall 33 and at least eight valve ports 31. Valve ports 31 are divided by endwall 33 into two independent sets of at least four valve ports each, which correspond to two axially divided sets of valve seat/header assemblies 23. Flow dividers 32 (oriented perpendicularly to the page in FIG. 5) further divide each of these sets into dual independent flow paths, and rotation of valve cylinders 22 diverts these flow paths among the valve seat/header assemblies, as described above.

Compounded valve 40 provides two axially coupled but otherwise independent valves 11A and 11B, in a compact, lightweight, reliable package. This significantly reduces mechanical requirements with respect to prior art designs that employ individually activated valves. The compounded design of valve 40 also provides coordinated flow control, as described above with respect to input valve 11A and outlet valve 11B of FIGS. 1A and 1B.

Compounded valve 40 is also adaptable to other, more generalized fluid flow and fluid processing applications. In particular, the embodiment of FIG. 5 shows individual flow dividers 32 arranged in phase (that is, aligned), such that both have the same angular position. In other embodiments, valves 11A, 11B operate at a fixed phase difference (that is, they co-rotate, but have different rotational positions). These embodiments include both reciprocating embodiments with a limited angular range, as described above with respect to FIG. 3, and fully rotational embodiments with an unlimited angular range. These embodiments also encompass applications in which compounded valves 11A, 11B provide more generalized flow diversion and flow control functions, which are not limited to the specific inlet and outlet functions of FIGS. 1A and 1B, above.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:
1. A valve comprising:
 a first rotary cylinder valve and a second rotary cylinder valve axially coupled to the first rotary cylinder valve, each of the rotary cylinder valves comprising:
  a valve body;
  a valve cylinder rotationally mounted within the valve body;
  first, second, third and fourth valve seats coupled to the valve body, the valve seats forming seals against the valve cylinder; and
  a flow divider dividing the valve cylinder, such that flow is prevented between the first valve seat and the third valve seat;

wherein the valve cylinder has a first position in which dual independent flow paths connect the first valve seat with the second valve seat and connect the third valve seat with the fourth valve seat; and wherein the valve cylinder is rotatable to a second position in which the dual independent flow paths connect the first valve seat with the fourth valve seat and connect the third valve seat with the second valve seat;

wherein the valve cylinders of the first and second rotary cylinder valves are coupled at an endwall to form an integrated, axially compounded valve cylinder, such that the first and second rotary cylinder valves co-rotate.

2. The valve of claim 1, wherein the valve seats comprise inner seals proximate a valve header and outer seals spaced from the valve header.

3. The valve of claim 1, wherein the valve seats are comprised of a polymer.

4. The valve of claim 1, wherein the valve cylinder comprises at least four valve ports.

5. The valve of claim 4, wherein the valve cylinder is comprised of stainless steel.

6. The valve of claim 1, wherein the valve body is comprised of aluminum.

7. The valve of claim 1, wherein the valve cylinder is further rotatable to a cutoff position in which flow is prevented between the first valve seat and any other valve seat and flow is prevented between the third valve seat and any other valve seat.

8. The valve of claim 7, wherein the valve cylinder is further rotatable to an equalization position in which an intermediate flow path connects the second valve seat with the fourth valve seat.

9. The valve of claim 8, wherein the intermediate flow path does not connect the first valve seat with the third valve seat.

10. The valve of claim 8, wherein the equalization position corresponds to an angular range between forty degrees and fifty degrees, as measured from the first position.

11. The valve of claim 7, wherein the cutoff position corresponds to an angular range between twenty-seven and one half degrees and sixty-two and one half degrees, as measured from the first position.

12. The valve of claim 1, wherein the second position corresponds to an angular range between sixty-two and one half degrees and one hundred seventeen and one half degrees, as measured from the first position.

13. A system comprising:
a reservoir for providing an inlet flow and for receiving an outlet flow;
first and second beds for removing a chemical from the inlet flow;
a vacuum for removing the chemical from the first and second beds;
a dual inlet diverter valve for cycling the inlet flow between the first bed and the second bed, while cycling the vacuum between the second bed and the first bed; and
a dual outlet diverter valve for cycling the outlet flow between the first bed and the second bed, while cycling the vacuum between the second bed and the first bed;
wherein at least one of the dual inlet diverter valve and the dual outlet diverter valve comprises:
a valve body;
a valve cylinder rotationally mounted within the valve body; and
first, second, third and fourth valve seats coupled to the valve body, the valve seats forming seals against the valve cylinder such that flow is prevented between the first valve seat and the third valve seat;

wherein the valve cylinder has a first position in which dual independent flow paths connect the first valve seat with the second valve seat and connect the third valve seat with the fourth valve seat;

wherein the valve cylinder is rotatable to a second position in which the dual independent flow paths connect the first valve seat with the fourth valve seat and connect the third valve seat with the second valve seat; and wherein at least one of the dual inlet diverter valve and the dual outlet diverter valve is rotatable to a cutoff position in which the inlet flow and outlet flow are cut off, and further rotatable to an equalization position in which an intermediate flow path connects the first bed with the second bed.

14. The system of claim 13, wherein the beds remove the chemical by adsorption, and wherein the vacuum removes the chemical by desorption.

15. The system of claim 13, wherein the dual inlet diverter valve and the dual outlet diverter valve are axially compounded and co-rotating.

16. A system comprising:
a reservoir for providing an inlet flow and for receiving an outlet flow;
first and second beds for removing a chemical from the inlet flow;
a vacuum for removing the chemical from the first and second beds;
a first diverter valve for cycling the inlet flow between the first bed and the second bed, while cycling the vacuum between the second bed and the first bed; and
a second diverter valve for cycling the outlet flow between the first bed and the second bed, while cycling the vacuum between the second bed and the first bed;
wherein each of the first and second diverter valves comprises:
a valve body;
a valve cylinder rotationally mounted within the valve body; and
first, second, third and fourth valve seats coupled to the valve body, the valve seats forming seals against the valve cylinder such that flow is prevented between the first valve seat and the third valve seat;
wherein the valve cylinder has a first position in which dual independent flow paths connect the first valve seat with the second valve seat and connect the third valve seat with the fourth valve seat;
wherein the valve cylinder is rotatable to a second position in which the dual independent flow paths connect the first valve seat with the fourth valve seat and connect the third valve seat with the second valve seat;
wherein the valve cylinder is rotatable to a cutoff position in which the inlet flow and outlet flow are cut off; and
wherein the valve cylinder is rotatable to an equalization position in which an intermediate flow path connects the first bed with the second bed.

17. The system of claim 16, wherein the first and second beds remove the chemical from the inlet flow by adsorption and the vacuum removes the chemical from the first and second beds by desorption, and wherein the first and second beds are thermally coupled such that the adsorption provides thermal energy for the desorption.

18. The system of claim 16, wherein the valve cylinders of the first and second diverter valves are coupled at an endwall to form an integrated valve cylinder, such that the first and second diverter valves are axially compounded and co-rotating.

19. The system of claim 16, wherein in the first position the first and second diverter valves form a source flow path from the reservoir to the first bed and back to the reservoir, such that the first bed removes the chemical from the inlet flow by adsorption, and the first and second diverter valves form independent vent flow paths between both ends of the second bed and the vacuum, such that the vacuum removes the chemical from the second bed by double-ended desorption.

20. The system of claim 19, wherein in the second position the first and second diverter valves form a source flow path from the reservoir to the second bed and back to the reservoir, such that the second bed removes the chemical from the inlet flow by adsorption, and the first and second diverter valves form independent vent flow paths between both ends of the first bed and the vacuum, such that the vacuum removes the chemical from the first bed by double-ended desorption.

* * * * *